Feb. 16, 1960 A. R. WELLS 2,925,483
DUAL CALIBRATION THERMOSTAT
Filed July 29, 1958
FIG.1
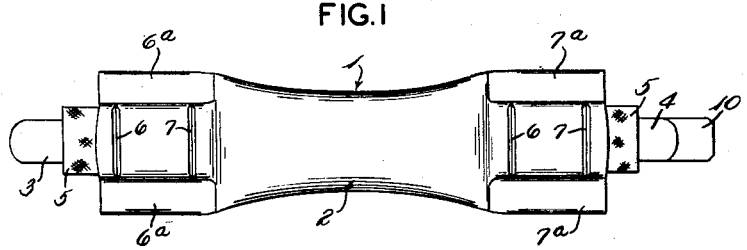
FIG.2
FIG.3
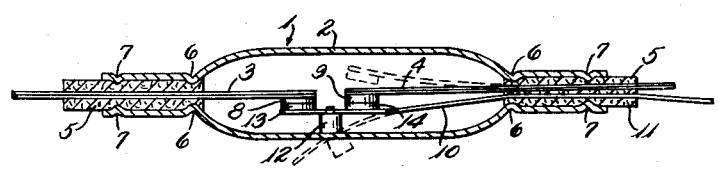
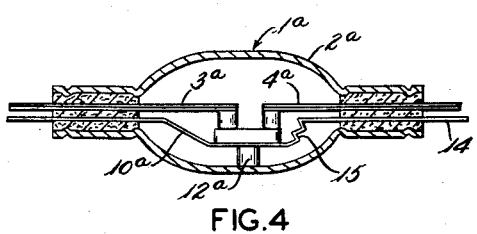
FIG.4
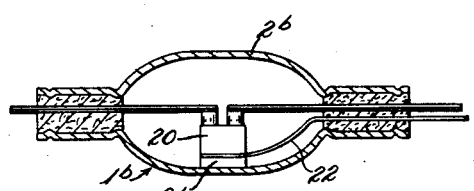
FIG.5
INVENTOR.
ALTON R. WELLS
BY Oldham & Oldham
ATTYS.

United States Patent Office 2,925,483
Patented Feb. 16, 1960

2,925,483

DUAL CALIBRATION THERMOSTAT

Alton R. Wells, Akron, Ohio

Application July 29, 1958, Serial No. 751,704

9 Claims. (Cl. 200—138)

The present invention relates to thermostats, and especially to a small, compact thermostat having two thermostat control arms therein for controlling a pair of circuits connected thereto.

Previously there have been various types of thermostats produced and one style of a thermostat, which has had good commercial acceptance, is that construction shown in U.S. Patent No. 2,586,309 wherein a pair of bi-metal arms are provided and extend into a carrier case for make and break contact action therein dependent upon the temperatures to which the thermostat is subjected. Patent 2,497,397 shows a similar single bi-metal arm thermostat wherein effective calibration means for a thermostat are disclosed.

In many instances, it has been necessary to provide two thermostats, such as have been shown in such patents, or to use pairs of thermostats in order to provide thermostatic control of a pair of circuits wherein different operating conditions are to be set up at two different operating temperatures.

In many instances, where thermostats are used, size is of great importance in that the articles are used with small electric appliances, for example, and in general, it is necessary that the thermostats be as small as is practical, but yet give desirable and accurate temperature control for the circuits involved.

Inasmuch as costs are always a factor in the production of any item, and because several thermostats may be used in a number of articles, it is very important that the cost of thermostats be held to a minimum, but that such cost not be reduced or lowered by sacrifice of any quality in the control action of the thermostat.

The general object of the present invention is to provide a novel and improved thermostat characterized by the provision of a pair of thermostat control arms in a single unit which arms can connect to and control different electric circuits at the same or different operating temperatures, as desired.

A further object of the invention is to include a pair of bi-metal thermostat arms that can be individually calibrated for operative engagement with a common conductor member within a thermostat case that is insulated from the controlled circuits whereby two electrical circuits can be controlled by a single thermostat unit.

Another object of the invention is to provide a thermostat having a pair of temperature calibratable arms therein operatively associated with a common contact and lead means so that one unit can provide two control actions in the same or different circuits at different operative temperatures.

Further objects of the invention are to provide a compact thermostat adapted for dual calibration and control of a pair of circuits with a minimum of variation from similar thermostats having only a single calibration and circuit control action at a minimum change of manufacturing procedures and of thermostat sizes; to provide a novel dual calibration thermostat unit with an insulated case; and to provide a novel cantilever positioned spring contact arm in a thermostat unit, which spring contact arm maintains itself in a fixed position against one side of the thermostat case means regardless of changes in the location and/or shape of the end means grasping and positioning the cantilever type contact spring arm in the unit.

The foregoing and other objects and advantages of the invention will be made more apparent as the specification proceeds.

Attention now is particularly directed to the accompanying drawings, wherein:

Fig. 1 is an enlarged plan view of a novel dual calibration thermostat embodying the principles of the invention;

Fig. 2 is a side elevation of the thermostat unit of Fig. 1;

Fig. 3 is a vertical section through the novel thermostat unit of Figs. 1 and 2 and with one bi-metal strip being indicated in the circuit open position and with the unloaded position of a contact arm also being indicated in dotted lines;

Fig. 4 is an enlarged vertical section through a modification of the thermostat of the invention showing a spring arm extending from both ends of the thermostat; and Fig. 5 is a vertical section of yet a further modification of the thermostat of the invention.

When referring to corresponding members shown in the drawings and referred to in the specification, corresponding numerals are used to facilitate comparison therebetween.

The present invention, generally speaking, relates to a dual calibration thermostat comprising a casing, different bi-metal strips secured to said casing at each end thereof by compressed sections of the casing determining the calibration setting of the individual bi-metal strips, each of said bi-metal strips having a cantilever section extending into the casing from the secured portion thereof and being insulated from the casing, contact means carried by each of the bi-metal strips in the cantilever sections thereof and usually protruding therefrom in the same direction, a conductive spring metal arm secured to the casing at one end thereof and insulated therefrom, which spring arm also has a cantilever section extending into the casing from the secured portion of the spring arm, an insulating spacer secured to the spring arm and spacing it from the casing, which spring arm is continually resiliently urged or biased towards the casing and is positioned to extend to a point adjacent and axially overlapping the contact means, and a pair of contact means secured in axially spaced relation to the spring arm for engaging the contact means on the bi-metal strips to make and break circuits therewith dependent upon the positions of such bi-metal strips which are controlled by the temperature conditions to which the thermostat is subjected.

Reference now is directed particularly to the details of the structure shown in the drawing, and a thermostat 1 of the invention is indicated and illustrates the currently preferred embodiment of the principles of the invention. This thermostat 1 includes a casing 2 that is formed from any suitable material and usually is of cylindrical or oval shape in section. A pair of bi-metal control or contact strips 3 and 4 are present in the unit and are of substantially conventional construction for control strips as used in many commercial thermostats made at this time. Such strips have the facility of bending from straight form in a predetermined direction under predetermined ambient temperature conditions.

It will be seen that each of these bi-metal strips 3 and 4 extends into the casing 2 from one end of the casing and with the bi-metal strips 3 and 4 being insulated from the casing by conventional means, such as a silicon-impregnated glass fiber insulation spacer, or sleeve 5. Such spacer or sleeve is clamped around the bi-metal strips 3 and 4 by means of transversely directed, axially spaced stakes or notches 6 and 7 formed in flattened portions of the ends of the casing 2 and with flattened sets of lands 6a and 7a in the casing 2 gripping the bi-metal strips 3 and 4 tightly and secure them in desired cantilevering positions within the casing 2. The cantilever lengths of the strips 3 and 4 may be about equal, as shown, or they may be of different lengths as desired. Furthermore, the bi-metal strips 3 and 4 may be made from the same, or different material and they may have the same or different thicknesses and/or widths in order to provide the same or different electrical and thermal responses at the same or different cycling rates when in operation. These stakes or notches 6 and 7 and lands 6a and 7a effectively and tightly anchor or secure end portions of the bi-metal strips in desired positions extending into the casing 2 and, as explained in said patents, referred to hereinabove, the setting or effective temperatures at which such bi-metal strips 3 and 4 make and break contacts with another member in the thermostat 1 can thus be effectively calibrated, or controlled. Hence, a dual calibration thermostat is provided by the present invention. At the same time, the casing 2 and elements received therein are of generally the same size and shape, and certainly are of the same overall size and appearance as a simple single calibration and one circuit control thermostat such as have been made heretofore.

Any desired types of contacts 8 and 9 are secured, as by spot welding, or by other suitable action, to the bi-metal strips 3 and 4 adjacent the ends of the cantilever sections thereon so that arcuate movement of the cantilever section of the bi-metal strips will bring such contacts into engagement with other means as described hereinafter for make and break action of electrical circuits to be controlled.

As an important feature and element of the present invention, a conductive metal spring arm 10 is secured within the casing 2 by one end of the casing being compressed around one portion of the spring arm 10. The remainder of the spring arm 10 extends into the interior of the casing 2 as a cantilever spring arm section or portion. Again, a suitable insulation sleeve or element 11 is positioned around the spring arm 2 to insulate it against electrical contact with the casing 2 or the adjacent bi-metal strip 4. The spring arm 10 naturally extends from the end of the insulation 11 for engagement with a suitable lead, or leads connecting the thermostat 1 to the electrical circuits to be controlled.

Fig. 3 of the drawings best shows that an insulation spacer or nubbin 12 is secured, as by cementing, or by a rivet, or other conventional means, to the cantilever section of the spring arm 10 to protrude therefrom towards the inner wall of the casing 2. Such spring arm 10 is of such initial shape, as indicated in dotted lines in Fig. 3, that it inherently is biased towards, or urged against the inner wall of the casing 2 and will maintain itself in contact therewith even through the stakes or notches 6 and 7 in the end of the casing 2 to which the spring arm 10 is secured have appreciable variation or change therein when calibrating the thermostat 1 for operative action. It also will be seen from the drawings that the spring arm 10 axially overlaps the contacts 8 and 9 on the end portions of the bi-metal strips 3 and 4. Suitable contact means 13 and 14 are secured to the spring arm 10 in axially spaced relation by any conventional means so that the contact means 13 and 14 can engage the contacts 8 and 9, respectively, for making and breaking electrical circuits with the leads or other elements connecting to the bi-metal strips 3 and 4. Obviously the contacts 13 and 14, as well as the contacts 8 and 9, may be of any conventional design and may have either flat disc-like faces, or may be of a convex shape, or both contacts can be flat, or rounded, as desired. A single contact may be used in lieu of the two contact means 13 and 14.

It will be seen that the novel thermostat of the invention is dead or insulated with relation to the controlled electrical circuits and conductive means extending into the casing 2.

It should be realized that in some instances, it may be possible to make the casing of the thermostat of the invention from non-conductive material and in such instances the bi-metal strips would not necessarily have to be insulated therefrom, and it is within the scope of the present invention to use any suitable type of a positioning arm in lieu of the bi-metal strips referred to herein to provide the desired movement or control action in the thermostat by change of position of such arm dependent upon the temperature conditions to which the thermostat is subjected. It likewise should be recognized that the spring arm of the thermostat may have any suitable type of or even no spacer element provided thereon dependent upon the electrical conductivity characteristics of the casing. Furthermore, such spacer element might be a flange or boss formed integrally with the spring arm 10 if a non-conductive casing is used.

While the present invention shows the use of a specific or extra contact means on the bi-metal strips used in the thermostat, in some instances it may be satisfactory to use integral portions of such strips for the actual contact sections in the thermostat.

With reference to the thermostat 1a indicated in Fig. 4, such thermostat has bi-metal strips 3a and 4a extending thereinto and a spring metal arm 10a is shown positioned in a manner similar to that shown in the thermostat of Figs. 1 through 3. However, the spring arm 10a has an extension section 14 thereon that extends from the opposite end of the casing 2a so that leads can be connected to such spring arm from either end of the thermostat, as desired. The spring arm extension section 14 is connected to the remainder of the spring arm 10a by a suitable expansion portion, in this instance shown to be a zig-zag portion 15. Hence, the spring arm 10a is still adapted to be resiliently urged against the inner wall of the casing under all normal operative or calibration conditions that may exist in the thermostat. Any movement produced in the spring arm 10a by different calibration actions in the thermostat would be absorbed in the zig-zag portion 15 of the unit as shown. An insulation nubbin or spacer 12a is carried by and suitably secured to the spring arm 10a.

A further modification of the invention is shown in Fig. 5, wherein a contact member 20 is secured within the casing 2b shown. Such contact member 20 preferably is secured, as by cementing or other suitable action, to a conventional insulation or spacer member 21. The spacer 21 is likewise secured to the inner surface or wall of the casing 2b by cementing, or other suitable adhesion means. Preferably a flexible lead 22 is secured, or welded, or otherwise affixed to the contact member 20 and extends from one end of the thermostat 1b. Thus in this instance, a dead or insulated casing 2b still is provided in the thermostat 1b and with a common contact member being provided for connecting the two circuits to the individually calibratable bi-metal strips or control arms of the thermostat of the invention.

The insulated casing type of a thermostat shown by the present invention usually is larger than the hot case type of a thermostat shown in my copending application, Serial No. 751,734. Usually the insulation means provided in such type of an insulated case or casing thermostat requires the provision of a larger unit than where a hot case thermostat is used. Thus, where sufficient internal spacings and clearances are provided, such as in larger electrical appliances, the dead case type of a thermostat control unit is normally used.

It will be realized that the thermostats of the invention may be used in any desired electric circuits for control action therein.

The spring arm 10 of the thermostat can be made from any suitable material, such as Phosphor bronze or other good conductive material, as desired, and likewise the contact means shown thereon may be integral with such spring arm in some instances, or may be separate elements as shown in the drawing.

From the foregoing, it will be seen that a novel, improved type of a thermostat has been provided by the invention. This thermostat is of very small, compact size and has a minimum of deviation from the manufacturing and production operations used in making prior types of single circuit control thermostats. This improved thermostat will effectively control the operation of a pair of circuits and the different bi-metal strips of the thermostat can readily be calibrated to make or break contacts at different operative temperature conditions. Hence, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

I claim:

1. In a thermostat having a conductive casing, a different bi-metal strip individually secured at one portion thereof to said casing at each end thereof in insulated relation to said casing and having cantilever sections extending into said casing towards each other but terminating in spaced axial relation, and contact means secured to said cantilever sections of said bi-metal strips and extending therefrom in the same direction, said bi-metal strips being calibratable by pairs of transversely extending axially spaced stake-like areas at each end of said casing where said bi-metal strips are secured thereto, the additional means comprising a conductive spring metal arm secured to said casing at one end thereof and insulated therefrom, said metal arm having a cantilever section extending into said casing to a point axially overlapping said contact means, an insulation spacer secured to said metal arm cantilever section and urged against said casing by said metal arm, and additional contact means secured to said metal arm cantilever section for engaging said first named contact means whereby said bi-metal strips can be individually calibrated independently of each other for engaging said additional contact means to make and break electrical contact therewith.

2. In a thermostat, a casing, a different bi-metal strip individually secured at one portion thereof to said casing at each end thereof in insulated relation to said casing and having cantilever sections extending into said casing towards each other, contact means secured to said cantilever sections of said bi-metal strips, said bi-metal strips being calibratable by changes in position occasioned by pairs of transversely extending axially spaced stake-like areas at each end of said casing where said bi-metal strips are secured to said casing, a resilient conductive metal arm secured to said casing at least at one end thereof and insulated therefrom at the portions of said casing including said stake-like areas, said metal arm having a cantilever section extending into said casing to a point axially overlapping said contact means, an insulation member carried by said metal arm cantilever section and urged thereby against said casing, said metal arm in the cantilever section thereof having inherent resiliency therein to maintain said insulation member urged against said casing regardless of changes in the position of said metal arm by calibration of said bi-metal strips by change of said stake-like areas, and additional contact means secured to said metal arm cantilever section for engaging said first named contact means whereby said bi-metal strips can be individually calibrated independently of each other and will individually bring said contact means thereon into engagement with said additional contact means on said metal arm.

3. In a thermostat, a casing, a different bi-metal strip individually secured at one portion thereof to said casing at each end thereof and having cantilever sections extending into said casing towards each other but terminating in spaced axial relation, contact means secured to said cantilever sections of said bi-metal strips and extending therefrom in the same direction, said bi-metal strips being calibratable by their engagement with said casing, a conductive spring metal arm secured to said casing at one end thereof in insulated relation to the adjacent one of said bi-metal strips, said metal arm having a cantilever section extending into said casing to a point axially overlapping said contact means, said metal arm having inherent resiliency to urge it continuously towards said casing and locate it in a fixed position with relation thereto, and additional contact means secured to said metal arm cantilever section for engaging said first named contact means whereby said bi-metal strips can be individually positioned and calibrated independently of each other to provide a dual control action in the thermostat.

4. A dual calibration thermostat comprising a casing, different bi-metal strips secured to said casing at each end thereof and having a cantilever section extending into said casing from the secured portion of such strips, said bi-metal strips being insulated from said casing, contact means secured to each of said bi-metal strips at the cantilever sections thereof and extending therefrom in the same direction, a conductive spring arm secured to said casing at one end thereof and insulated therefrom, said spring arm having a cantilever section extending into said casing from the secured portion of such spring arm, an insulating spacer secured to the cantilever section of said spring arm and spacing it from said casing, said spring arm being resiliently urged towards said casing and being of an axial length to extend to a position adjacent said contact means, and a pair of further contact means secured in axially spaced relation to said spring arm for engaging said contact means on said bi-metal strips to make and break circuits therewith dependent upon the positions of said bi-metal strips.

5. A dual calibration thermostat comprising a casing, different bi-metal strips secured to said casing at each end thereof and having a cantilever section extending into said casing from the secured portion thereof, contact means secured to each of said bi-metal strips at the cantilever sections thereof and extending in the same direction, a conductive spring arm secured to said casing at one end thereof, said spring arm having a cantilever section extending into said casing from the secured portion of such spring arm, insulation and spacer means operatively associated with said spring arm and spacing it from said casing, said spring arm being resiliently urged towards said casing and being of a length to have a portion positioned adjacent said contact means, and further contact means secured to said portion of said spring arm for engaging said contact means on said bi-metal strips to make and break circuits therewith dependent upon the positions of said bi-metal strips.

6. A dual calibration thermostat comprising a casing, different bi-metal strips secured to said casing at each end thereof and having a cantilever section extending into said casing from the secured portion thereof, contact sections operatively associated with each of said bi-metal strips at the cantilever sections thereof, a conductive spring arm secured to said casing at one end thereof, said spring arm having a cantilever section extending into said casing from the secured portion of such spring arm, spacer means carried by said spring arm and engaging said casing, said spring arm being resiliently urged towards said casing to be held in a fixed position by engagement therewith, and contact means operatively associated with said spring arm for engaging said contact sections on said bi-metal strips to make and break contacts therewith dependent upon the positions of said bi-metal strips and the temperatures to which the thermostat is subjected.

7. A thermostat as in claim 6 where said spring arm has an extension section secured to and extending from said casing at the opposite end thereof as the cantilever section of said spring arm, said extension section being connected to said cantilever section by an expansion portion.

8. In a thermostat, a casing, a different bi-metal strip individually secured at one portion thereof to said casing at the different ends thereof in insulated relation to said casing and having cantilever sections extending into said casing towards each other, a contact secured to each of said cantilever sections of said bi-metal strips, a common contact means operatively associated with said casing in the interior thereof adjacent said contacts for engaging said contacts, means insulating said contact means from said casing, and conductive means connected to said contact means and extending from said casing at an end thereof in insulated relation thereto, said bi-metal strips individually bringing said contacts thereon into engagement with said contact means to make and break an electric circuit therewith.

9. A dual calibration thermostat for controlling a pair of circuits comprising a casing, different bi-metal strips secured to said casing at each end thereof and each having a cantilever section extending into said casing from the secured portion thereof, a conductive spring arm secured to and insulated from said casing at one end thereof, said spring arm being insulated from the said bi-metal strip at said one end of said casing and having a cantilever section extending into said casing from the secured portion of such spring arm and overlapping both of said bi-metal strips, and spacer means operatively associated with said spring arm and spacing it from said casing, said spring arm being resiliently urged towards said casing but being spaced therefrom by said spacer means, said bi-metal strips being individually movable towards said spring arm for operatively engaging it to make and break circuits therewith dependent upon the positions of said bi-metal strips whereby two circuits can be both connected to said spring arm and be individually connected to said bi-metal strips for individual circuit control thereby.

References Cited in the file of this patent
UNITED STATES PATENTS

| | | |
|---|---|---|
| 2,279,929 | Schoumaker | Apr. 14, 1942 |
| 2,497,397 | Dales | Feb. 14, 1950 |
| 2,586,309 | Dales | Feb. 19, 1952 |